US010110858B2

(12) United States Patent
Loce et al.

(10) Patent No.: US 10,110,858 B2
(45) Date of Patent: Oct. 23, 2018

(54) COMPUTER-VISION BASED PROCESS RECOGNITION OF ACTIVITY WORKFLOW OF HUMAN PERFORMER

(71) Applicant: Conduent Business Services, LLC, Dallas, TX (US)

(72) Inventors: Robert P. Loce, Webster, NY (US); Beilei Xu, Penfield, NY (US); Edgar A. Bernal, Webster, NY (US); Saurabh Prabhat, Webster, NY (US); Wencheng Wu, Rochester, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 256 days.

(21) Appl. No.: 14/688,230

(22) Filed: Apr. 16, 2015

(65) Prior Publication Data
US 2016/0234464 A1  Aug. 11, 2016

Related U.S. Application Data

(60) Provisional application No. 62/113,149, filed on Feb. 6, 2015.

(51) Int. Cl.
*H04N 7/18* (2006.01)
*G06K 9/00* (2006.01)

(52) U.S. Cl.
CPC ......... *H04N 7/183* (2013.01); *G06K 9/00335* (2013.01); *G06K 9/00711* (2013.01); *G06K 9/00771* (2013.01); *H04N 7/181* (2013.01)

(58) Field of Classification Search
CPC ........... G06K 9/00335; G06K 9/00711; G06K 9/00771; G06K 9/00624; G06K 9/00718;
(Continued)

(56) References Cited

U.S. PATENT DOCUMENTS 6,195,121 B1 * 2/2001 Huang ............... G06K 9/00228
348/144
6,224,385 B1 * 5/2001 Nitta .................... G05B 19/409
434/118
(Continued)

FOREIGN PATENT DOCUMENTS

EP  1139298 A2 * 4/2001
JP  406325044 A * 11/1994
(Continued)

OTHER PUBLICATIONS

Machine generated translation of PCT WO 2014/028959 to Winkler, Feb. 27, 2014.*

*Primary Examiner* — David Harvey
(74) *Attorney, Agent, or Firm* — Fay Sharpe LLP

(57) ABSTRACT

A computer-vision based method for validating an activity workflow of a human performer includes identifying a target activity. The method includes determining an expected sequence of actions associated with the target activity. The method includes receiving a video stream from an image capture device monitoring an activity performed by an associated human performer. The method includes determining an external cue in the video stream. The method includes associating a frame capturing the external cue as a first frame in a key frame sequence. The method includes determining an action being performed by the associated human performer in the key frame sequence. In response to determining the action in the key frame sequence matching an expected action in the target activity, the method includes verifying the action as being performed in the monitored activity. In response to not determining the action in the key frame sequence, the method includes generating an alert indicating an error in the monitored activity.

18 Claims, 5 Drawing Sheets

(58) Field of Classification Search
CPC .............. G06F 3/017; G06Q 10/06316; G06T 2207/30196; G06T 2207/10016; H04N 7/18; H04N 7/188; H04N 7/183; G05B 19/41875; G05B 2219/31442
USPC ........................................................ 348/143
See application file for complete search history.

(56) References Cited

U.S. PATENT DOCUMENTS

| | | | | |
|---|---|---|---|---|
| 6,236,736 | B1* | 5/2001 | Crabtree | G01S 3/7865 235/383 |
| 7,693,758 | B1* | 4/2010 | Bacco | G06Q 10/08 348/143 |
| 8,281,243 | B2* | 10/2012 | Hanawa | G06Q 10/06393 715/712 |
| 9,143,843 | B2* | 9/2015 | De Luca | G08B 21/12 |
| 9,262,681 | B1* | 2/2016 | Mishra | G06K 9/00771 |
| 9,665,777 | B2* | 5/2017 | Naikal | G06K 9/00771 |
| 9,760,852 | B2* | 9/2017 | Hasan | G06Q 10/06398 |
| 9,875,409 | B2* | 1/2018 | Ohmura | G06K 9/00771 |
| 2003/0133614 | A1* | 7/2003 | Robins | G08B 13/19602 382/219 |
| 2003/0142272 | A1* | 7/2003 | Ono | G03B 21/32 352/87 |
| 2003/0193571 | A1* | 10/2003 | Schultz | H04N 5/225 348/207.99 |
| 2005/0180637 | A1* | 8/2005 | Ikeda | G06K 9/00335 382/224 |
| 2006/0104479 | A1* | 5/2006 | Bonch-Osmolovskiy | G06K 9/00355 382/103 |
| 2006/0239545 | A1* | 10/2006 | Tedesco | G06F 17/30256 382/159 |
| 2008/0177646 | A1* | 7/2008 | Frink | G06Q 10/1091 705/32 |
| 2008/0186381 | A1* | 8/2008 | Guo | G08B 13/19663 348/143 |
| 2009/0070163 | A1* | 3/2009 | Angell | G06Q 10/04 705/7.26 |
| 2009/0232353 | A1* | 9/2009 | Sundaresan | G06K 9/00342 382/103 |
| 2011/0148875 | A1* | 6/2011 | Kim | G06T 13/40 345/420 |
| 2012/0008836 | A1* | 1/2012 | Bobbitt | G06K 9/00771 382/113 |
| 2012/0075450 | A1* | 3/2012 | Ding | G06K 9/00335 348/77 |
| 2013/0027561 | A1* | 1/2013 | Lee | G06Q 30/02 348/150 |
| 2013/0030875 | A1* | 1/2013 | Lee | G06Q 10/06311 705/7.38 |
| 2014/0083058 | A1* | 3/2014 | Issing | B65G 1/1378 53/473 |
| 2015/0066550 | A1* | 3/2015 | Harada | G06Q 10/063 705/7.11 |
| 2015/0131856 | A1* | 5/2015 | Matsunaga | F16P 3/142 382/103 |
| 2015/0185731 | A1* | 7/2015 | Ham | G05B 19/41875 700/111 |
| 2015/0213838 | A1* | 7/2015 | Dinev | G11B 27/105 386/224 |
| 2016/0012361 | A1* | 1/2016 | Sugiyama | G06Q 10/0639 705/7.38 |
| 2016/0070958 | A1* | 3/2016 | Whelan | G06F 3/017 382/107 |
| 2016/0095317 | A1* | 4/2016 | Brinker | A01N 57/20 504/125 |
| 2016/0140395 | A1 | 5/2016 | Kumar et al. | |

FOREIGN PATENT DOCUMENTS

| | | | |
|---|---|---|---|
| JP | 002940028 | B2 * | 9/1999 |
| JP | 200352039 | A * | 2/2003 |
| KR | 20130112098 | A * | 10/2013 |
| WO | WO 2014/028959 | A1 * | 2/2014 |

* cited by examiner

COMPUTER-VISION BASED PROCESS RECOGNITION OF ACTIVITY WORKFLOW OF HUMAN PERFORMER

This is application claims priority to U.S. Provisional Application Ser. No. 62/113,149, filed Feb. 6, 2015, entitled "Computer-Vision Based Process Recognition", by Robert Loce, et al., the disclosure of which is hereby incorporated by reference in its entirety.

BACKGROUND

The present disclosure relates to a computer-vision-based process recognition and, more particularly, to a verification method and system that uses computer-vision technology to verify steps, objects, and quantities in a process.

Pharmaceutical companies and pharmacies must ensure safe and reliable processes for manufacturing or delivering pharmaceuticals. To ensure product quality, companies implement controlled procedures during all phases of production. Additionally, pharmaceutical companies generally integrate validation requirements to assess the process used to produce the pharmaceutical product. Similar requirements are implemented in other industries, such as in food preparation and packaging.

One approach in the prior art monitors the process on camera for later review. A human reviewer examines still images or image frames to verify that the pharmaceutical was prepared properly—i.e., that all steps were executed correctly. This approach may rely on a technician performing a manual step to flag the human reviewer who is examining the images. For example, the technician can manually scan a bar code when he or she is performing a part of the process. In another example, the technician can enter measurement data as he or she measures out or mixes pharmaceutical ingredients. For example, the technician can keystroke an entry as input into a computer. The human reviewer can search the images where the flag occurred for any record of the measurement. For example, in the prior art approach, the human reviewer can search for a scale of known location in the captured image and verify that the reading on the scale matches the measurement value entered by the technician. These verification methods are duplicative, as they require a first manual step performed by the technician and a second manual review performed by the human reviewer for the verification operation. Alternately, the human reviewer can search the images for the reading on the scale without corresponding input being provided by the technician. This approach validates the quantity of pharmaceutical ingredients used to produce the product, thus ensuring the quality of the product.

Any verification process that relies on a human performer reviewing captured image data can lead to increased costs and inefficiencies. A human performer is also susceptible to errors, such as misreading image content or not catching improper technician handling. The duration required for a human performer to manually go through images can also delay the delivery of the products to customers, ultimately costing the company potential profits.

A more robust and efficient verification process is desired for verifying that a product is prepared correctly. A verification process is desired which verifies actions within complex, multistep activities. Additionally, a method and system are desired which automatically validates quantities in the manufacture of the products.

INCORPORATION BY REFERENCE

The disclosure of co-pending and commonly assigned U.S. Ser. No. 14/596,592, filed Jan. 14, 2015, entitled, "Adaptive Sampling For Efficient Analysis Of Egocentric Videos", by Jayant Kumar, et al., totally incorporated herein by reference.

BRIEF DESCRIPTION

One embodiment of the disclosure relates to a computer-vision-based method for validating an activity workflow of a human performer. The method includes determining an expected sequence of actions associated with a target activity. The method includes receiving a video stream from an image capture device monitoring an activity performed by an associated human performer. The method includes determining an external cue in the video stream. The method includes associating a frame capturing the external cue as a first frame in a key frame sequence. The method includes determining an action being performed by the associated human performer in the key frame sequence. In response to determining the action in the key frame sequence matching an expected action in the target activity, the method includes verifying the action as being performed in the monitored activity. In response to not determining the action in the key frame sequence, the method includes generating an alert indicating an error in the monitored activity.

Another embodiment of the disclosure relates to a system for validating an activity workflow of a human performer. The system includes a computer device including a memory in communication with a processor. The processor is configured to determine an expected sequence of actions associated with a target activity. The processor is configured to receive a video stream from an image capture device monitoring an activity performed by an associated human performer. The processor is configured to determine an external cue in the video stream. The processor is further configured to associate a frame capturing the external cue as a first frame in a key frame sequence. The processor is configured to determine an action being performed by the associated human performer in the key frame sequence. In response to determining the action in the key frame sequence matching an expected action in the target activity, the processor is configured to verify the action as being performed in the monitored activity. In response to not determining the action in the key frame sequence, the processor is configured to generate/trigger an alert indicating an error in the monitored activity.

Another embodiment of the disclosure relates to a computer-vision based method for validating an activity workflow of a human performer. The method includes identifying a target activity. The method includes determining an expected sequence of actions associated with the target activity. The method includes receiving a video stream from an image capture device monitoring an activity performed by an associated human performer. The method includes determining an action being performed by the associated human performer in the monitored video stream. In response to determining the action matching an expected action in the monitored video stream, the method includes verifying the action as being performed in the monitored activity. In response to not determining the action in the monitored video stream, generating an alert indicating an error in the monitored activity.

DETAILED DESCRIPTION

The present disclosure relates to a computer-vision-based process recognition and, more particularly, to a verification method and system that uses computer-vision technology to verify steps, objects, and quantities in a process used to produce a product for quality assurance.

The verification process disclosed herein is contemplated for application in the pharmaceutical industry, but an application of the present disclosure is not limited to any one industry. The disclosure can be applied to other like industries that implement quality assurance measures, such as the food (packaging) industry and cosmetic industry, etc. Particularly, pharmaceutical companies can verify steps, equipment ("objects"), and quantities (for example, of a pharmaceutical ingredient) used in producing a pharmaceutical. Regardless, the disclosure is contemplated for verifying the processes performed by a human performer, whereby a human is performing the steps, using the objects, and/or measuring out or mixing quantities of ingredients.

An "action" as used herein refers to a step in a process. The action can refer to a step, part of a process or subprocess.

An "activity" or "activities", as used herein, refers to a sequence of actions and, in some embodiments, refers to the sequence of steps in an entire process.

A "target activity" as used herein refers to the process required for producing a certain product or result.

An "expected action" is a step included in the target activity for generating the certain product or result.

Figure 1:
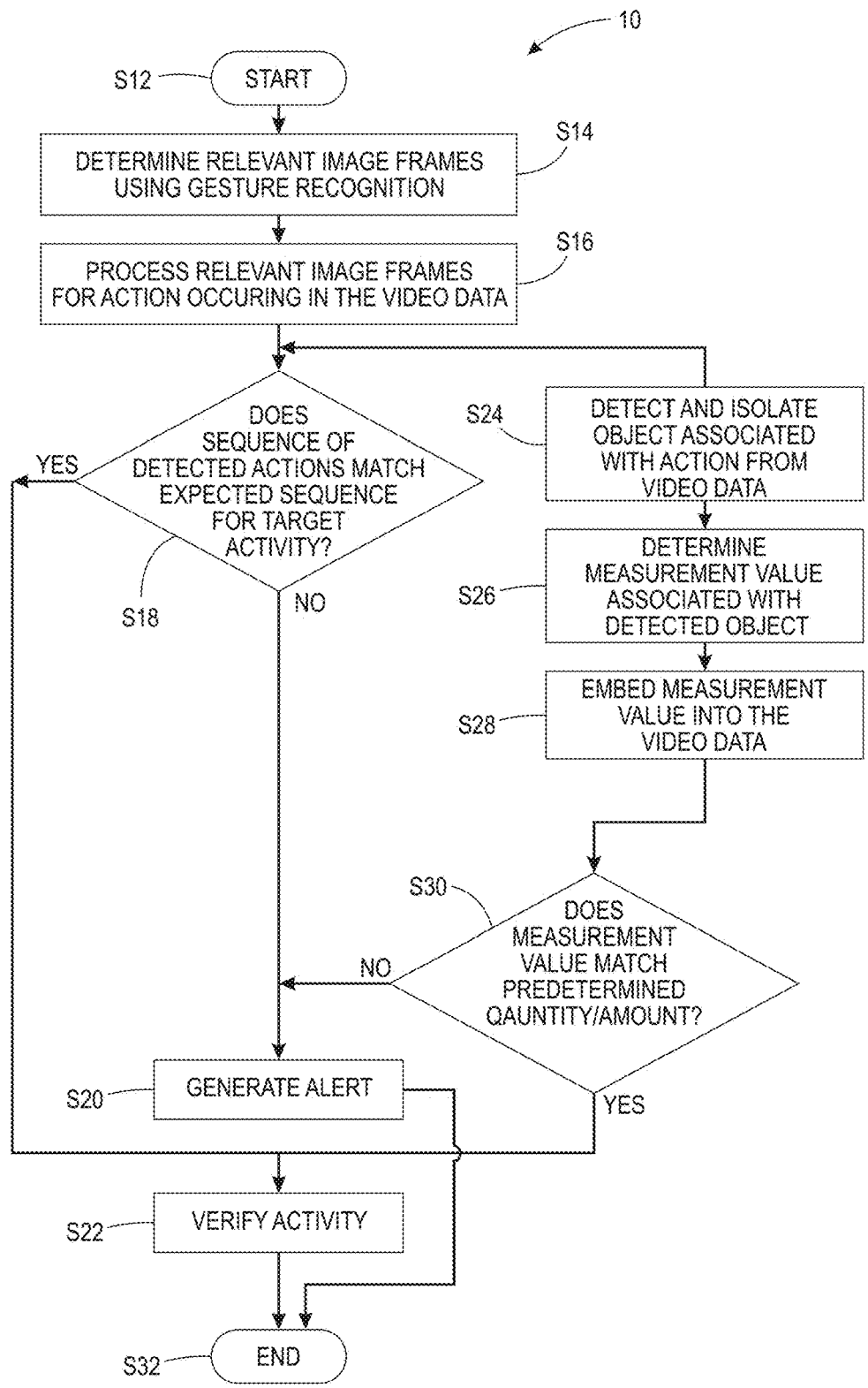
FIG. 1 is a flowchart describing an overview of a method of verifying an activity workflow of a human performer.

FIG. 1 is a flowchart describing an overview of a method 10 of verifying an activity workflow of a human performer. The method starts at S12. In a preprocessing phase, the system trains a classifier regarding actions in an activity. In the processing phase, the system determines relevant image frames by determining an external cue at S14, such as a gesture made by the human performer using gesture recognition. Alternatively, the system can determine relevant image frames using other cues such as an appearance of a certain object via object detection; a video analysis to detect a segment that includes lack of motion; audio feedback; voice recognition; and an input, for example, a key stroke or a scanning of a barcode, made at a GUI by the human performer and the system. There is no limitation made herein as to the type of action or gesture used to trigger the verification process. In a contemplated embodiment, a human performer captured in a monitored area can perform a gesture that triggers the system to capture the frame and/or subsequent frames in the sequence or to label the position of the start frame if a continuous capturing mode is used. This gesture can be performed intentionally by the human performer. Alternatively, the gesture can be part of a natural movement made by the human performer, such as an expected hand movement or object placement. The gesture is treated as an external cue that an action will occur. Mainly, in response to recognizing a gesture, the system processes the key image frames for an action occurring in the captured video at S16. In one embodiment, the system can extract features from the key image frames and apply a trained classifier to the features, which outputs an action class. At S18, the system compares a sequence of the detected/classified actions against an expected sequence for the target activity to determine if all actions are present and performed in order. The system generates an alert at S20 if an action is missing or performed out of order. At S22, the system verifies that the activity was performed correctly by the human performer if the detected/classified actions match the expected actions and/or sequence of actions.

Further in response to recognizing a gesture, the system processes the key image frames for additional verification data. The system detects and isolates an object associated with the action from the video frame at S24. The system processes image data corresponding to the object to determine a measurement value associated with the object at S26. In one embodiment, the system can embed the measurement information into the video data as metadata. at S28. The embedded measurement information can be compared against a predetermined value to verify quantities corresponding to the object used for performing the action ("object-centric action") at S30. The system generates an alert if the measurement value does not match the predetermined value at S20. The system verifies that the activity was performed correctly by the human performer if the measurement value matches the predetermined value at S22. The method ends at S32.

Figure 2:
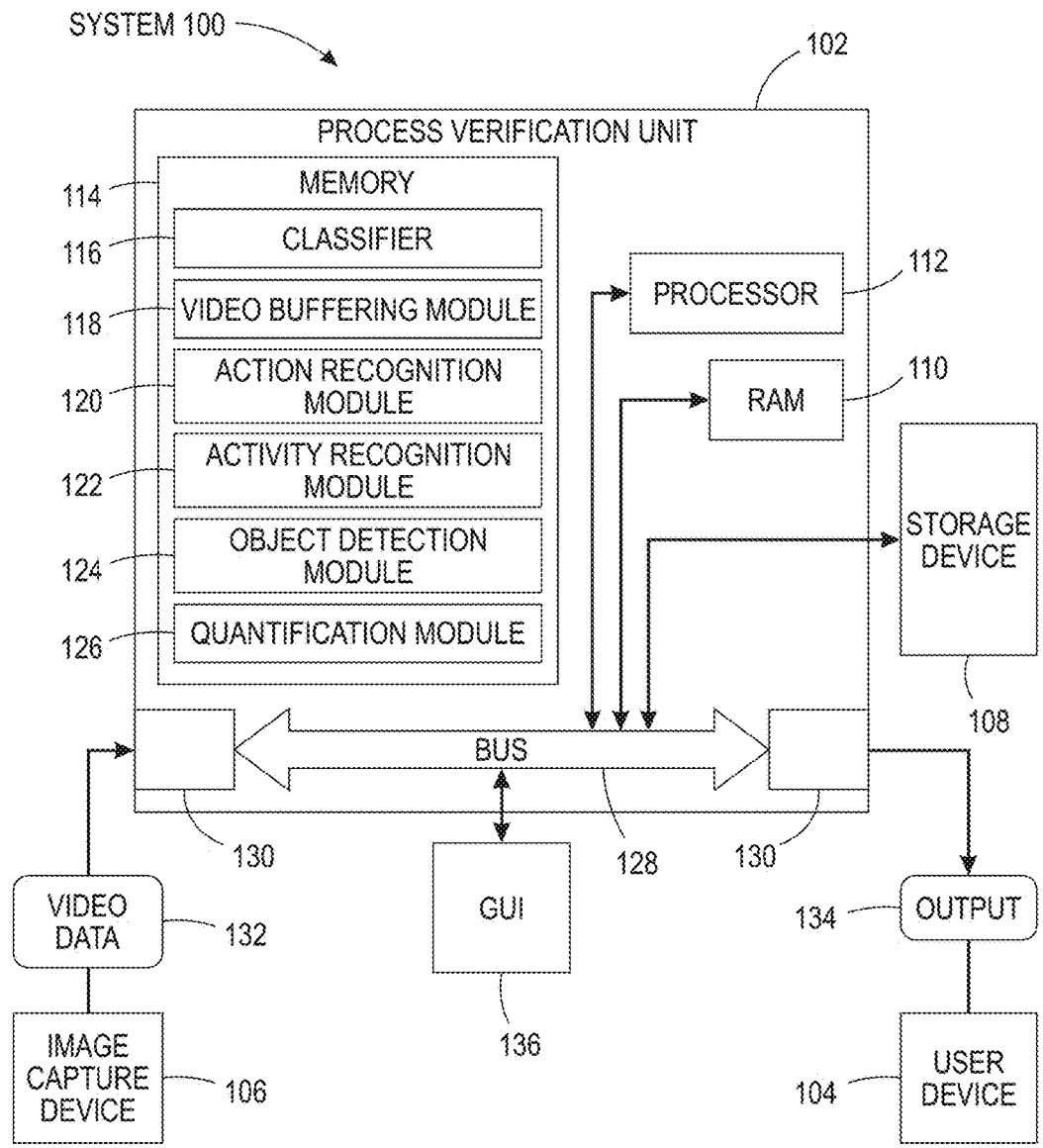
FIG. 2 is a schematic illustration of a computer-vision based system for process verification.

FIG. 2 is a schematic illustration of a computer-vision-based system ("the system 100") for process verification. The system 100 includes a process verification unit 102 and a user device 104, linked together by communication links, referred to herein as a network. In one embodiment, the system 100 may be in further communication with an image capture device 106. These components are described in greater detail below.

The process verification unit 102 illustrated in FIG. 2 includes a controller 110 that is part of or associated with the process verification unit 102. The exemplary controller 110 is adapted for controlling an analysis of video data received by the system 100. The controller 110 includes a processor 112, which controls the overall operation of the process verification unit 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the process verification unit 102, executes instructions stored in memory 114 for performing the parts of the method outlined in FIGS. 1 and 3. In some embodiments, the processor 112 and memory 114 may be combined in a single chip.

The process verification unit 102 may be embodied in a networked device, such as the image capture device 106, although it is also contemplated that the process verification unit 102 may be located elsewhere on a network to which the system 100 is connected, such as on a central server, a networked computer, or the like, or distributed throughout the network or otherwise accessible thereto. In other words, the processing can be performed within the image capture device 106 on site or in a central processing offline or server computer after transferring the video data through the network. In one embodiment, the image capture device 106 can be adapted to relay and/or transmit the video data 132 to the process verification unit 102. In another embodiment, the video data 132 may be input from any suitable source, such as a workstation, a database, a memory storage device, such as a disk, or the like. The image capture device 106 is in communication with the controller 110 containing the processor 112 and memories 114.

The stages disclosed herein are performed by the processor 112 according to the instructions contained in the memory 114. In particular, the memory 114 stores a previously trained classifier 116 (for example, a support vector machine (SVM), a neural network, a random forest (RF), etc.) operative to classify features extracted from the video data 132 as belonging to an action class; a video acquisition/buffering module 118, which acquires video data from the image capture device 106; an action recognition module 120, which processes the video data to determine actions captured in the video data; an activity recognition module 122, which determines the sequence of actions performed in the video data and determines if the activity was performed properly using the sequence; an object detection module 124, which processes the video data for searching for and detecting predetermined object(s); and, a quantification module 126, which performs a quantification about the detected object to determine a measure associated with the object. Embodiments are contemplated wherein these instructions can be stored in a single module or as multiple modules embodied in different devices. The modules 116-126 will be later described with reference to the exemplary method.

The software modules as used herein, are intended to encompass any collection or set of instructions executable by the process verification unit 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the process verification unit 102 may be all connected by a bus 128.

With continued reference to FIG. 2, the process verification unit 102 also includes one or more communication interfaces 130, such as network interfaces, for communicating with external devices. The communication interfaces 130 may include, for example, a modem, a router, a cable, and and/or Ethernet port, etc. The communication interfaces 130 are adapted to receive the video data 132 as input.

The process verification unit 102 may include one or more special purpose or general purpose computing devices, such as a server computer, controller, or any other computing device capable of executing instructions for performing the exemplary method.

The image capture device 106 can include a video camera or still shot camera. In the contemplated embodiment, the image capture device includes one or more surveillance cameras that capture video ("video camera 106") from the area-of-interest, such as, in one example, laboratory. The number of cameras may vary depending on the dimensions of the area being monitored. It is contemplated that the combined field of view of multiple cameras typically comprehends the entire area surrounding monitored area. The video camera 106 can include a magnifier operative to magnify select sections of the area-of-interest.

With continued reference to FIG. 2, the system 100 can include a storage device 108 that is part of or in communication with the process verification unit 102. In a contemplated embodiment, the process verification unit 102 can be in communication with a server (not shown) that includes a processing device and memory, such as storage device 108, or has access to a storage device 108, for storing expected actions and sequences associated with target activities.

The video data 132 undergoes processing by the process verification unit 102 to output verification data (such as, for example, the video data embedded with quantitative data, and alerts, etc.) 134. Furthermore, the system 100 can display the output 134 in a suitable form on a graphic user interface (GUI) 136. The GUI 136 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 112. Alternatively, the process verification unit 102 can provide the verification output to the user device 104, for further user review.

Figure 3:
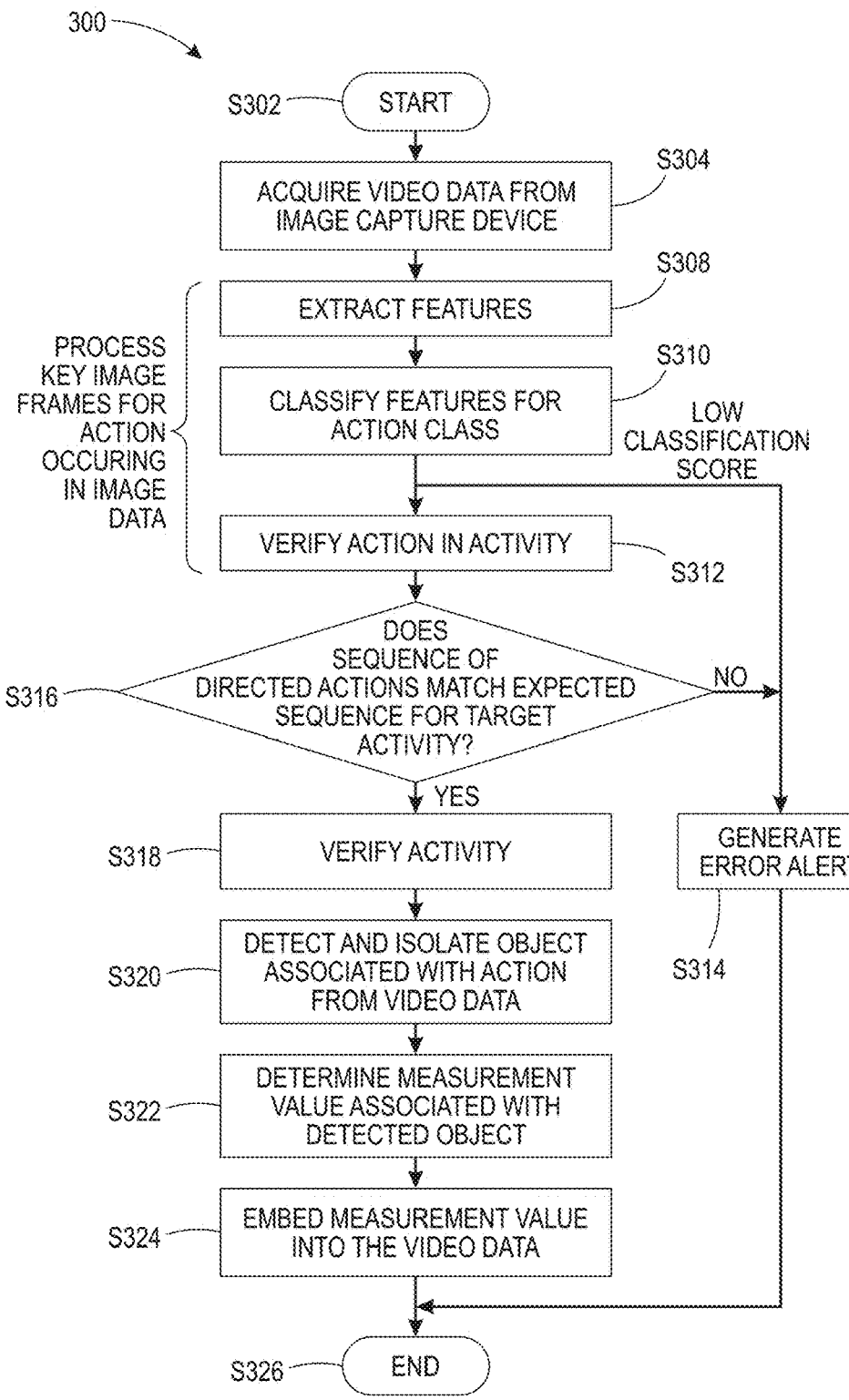
FIG. 3 is a detailed flowchart describing a method of validating an activity workflow of a human performer.

FIG. 3 shows a detailed flowchart describing a method 300 for validating an activity workflow of a human performer. The method starts at S302. The video buffering module 118 acquires video data from the image capture device at S304. At S306, the action recognition module 120 processes key frames of the video data to determine the action being performed by the human performer in the video stream. To identify the key frames in one embodiment, a gesture made by the human performer being monitored—and recognized by the system—can signal which frames the system should process by performing a deliberate gesture for the system to recognize. Alternatively, the key frames are identified via other cues such as audio feedback and voice recognition. Yet in another alternative, the key frames are identified via communications between, for example, a GUI—such as, via a key stroke or a scanning of a barcode by the human performer—and the process verification unit 102. In other embodiments, the key frames can be identified by an appearance of a certain object via object detection. In further embodiments, the key frames can be identified via a video analysis on the video data to detect a segment that includes lack of motion. In another embodiment, the system has knowledge of expected actions and searches the video data for an action matching the expected actions, without any prompting from a human performer.

The module 120 determines the action being performed in the key frames of the video data by localizing the action. One such approach used for detecting and classifying human actions in video data is provided in the disclosure of co-pending and commonly assigned U.S. Ser. No. 14/596,592, filed Jan. 14, 2015, entitled, "Adaptive Sampling For Efficient Analysis Of Egocentric Videos", by Jayant Kumar, et al., the contents of which are totally incorporated herein by reference. This approach produces dense sampling in important (sub-) regions of a video and sparse sampling in unimportant regions. Adaptive sampling performs sampling on a sub-region of the frame over a period over time, obtaining a spatio-temporal (ST) patch or descriptor from the sub-region.

When trying to determine if an action is performed, the module 120 can search the video stream for visual representations (i.e., optical flow) of an action or object movement, etc. Essentially, the module 120 tries to recognize the vicinity of the expected action. Generally, the module 120 extracts a reduced set of features around a region of interest (or ST patches) in a video frame at S308. There is no limitation to the type of features extracted from the video, but non-limiting examples can include SIFT (scale-invariant feature transform) and HOG (histogram of gradient orients) features, local binary patterns (LBP), 3D versions of said features, as well as space time interest points (STIP), and the like, etc. The region of interest can include the location of an object (such as a hand of the human performer) expected to appear in a video frame.

As an illustrative example, the adaptive sampling may be performed in a sub-region that includes the human performer's hand. The hand may be detected via a hand segmentation algorithm described in the co-pending disclosure. One or more features may be extracted from the ST patches identified within sub-regions that include the human performer's hand. In other words, this approach segments an action by recognizing a hand gesture. The gesture recognition alerts the system that an action may follow in subsequent video frames. The system therefore aims to match the action to a known action. Therefore at S310 an action classifier is then applied to the one or more features to identify what action is occurring in the one or more frames that are being adaptively sampled.

In response to the classifier outputting an action class, the module 120 associates the output as the action performed by the human performer. In other words, the system associates the action as matching an expected action in the monitored video stream. The system verifies the recognized action as being properly satisfied by the human performer in the monitored activity at S312. In response to the classifier outputting a low classification score, the module 120 associates the output as indicating that an expected action is not present in the monitored activity. In response to not detecting the action in the monitored video stream, the system can generate an alert, indicating an error in the monitored activity at S314

Continuing with FIG. 3, the action module 120 provides the detected/recognized actions to the activity recognition module 122, which uses a sequence of the actions to recognize the activity. During a pre-processing phase, the activity recognition module 122 receives input regarding the target activity expected to be performed in the video stream. This target activity is treated as a reference activity used in the verification process. The module 122 acquires from the storage device an expected sequence of actions associated with the target activity. In other words, the module 122 determines the sequence of steps that should be present for detection in the video stream to verify that the monitored activity is compliant and/or properly performed.

The activity recognition module 122 receives the detected/recognized actions from the action recognition module 120. In one embodiment, the action recognition module 120 can transmit the actions in real time, as each is detected, to the activity recognition module 120. The activity recognition module 122 can compare each action against the expected sequence. In another embodiment, the action recognition module 120 can transmit the number of detected actions together to the activity recognition module 120. The activity recognition module 122 orders the actions into the sequence they were detected in the video data. The module 120 compares the detected sequence of actions against the expected sequence of actions at S316. In response to the determined sequence of actions matching the expected sequence of actions, the system verifies the activity as being properly satisfied by the human performer at S318. In response to the determined sequence of actions not matching the expected sequence, the system can generate/trigger an alert, indicating an error in the monitored activity at S314.

Similarly, in response to a detected action satisfying an expected action in the sequence, but not where it belongs in the sequence (i.e., out of order), the system can generate/trigger the alert, indicating an error in the monitored activity. However, if the target activity permits some leeway in the order of operations, the activity recognition module 122 can receive from the storage device a predetermined sequence range of which the expected action should appear. The module 122 can perform a thresholding operation on where the recognized action was detected in the sequence of actions to determine whether the activity was performed properly or not. In response to the detected action falling within the predetermined sequence range, the system can verify that the activity was performed correctly. In response to the detected action not falling within the predetermined sequence range, the system can generate/trigger an alert, indicating an error in the monitored activity.

In one embodiment, the alert can be provided in real-time as, for example, a message on the GUI, an audible message, or a haptic message. In another embodiment, the alert generated by the system can include a notification provided to the user device 104. The notification, in one contemplated embodiment, can suggest and/or indicate that a particular step or the overall process receive greater scrutiny. To assist in the further scrutiny, discussed infra, the alert can be provided with information embedded in the video data by the system.

Continuing at FIG. 3, to assist in this scrutiny or further verification, the system analyzes a representation or objects extracted from the video data. Certain objects are associated with expected actions. These objects can include equipment that the human performer uses while performing the action. In an illustrative example where a human performer (such as a lab technician) is measuring or mixing ingredients, the object can include a syringe, a scale, or a vial, etc. In response to detecting the action, the system can analyze the object or read a measurement corresponding to the object to determine if the action was performed properly.

There is no limitation made herein to what the object consists of, but the disclosure contemplates that an expected measurement value can be associated with the object at certain phases of the activity. Mainly, the storage device stores predetermined measurement data corresponding to the object and/or expected action. In one embodiment, the quantification module 126 analyzes an object in a field image to determine a quantification associated with the object. For example, where the expected action included injecting an ingredient into a syringe, and the recognition process determined that the action was performed, the present disclosure can further verify that the correct amount of ingredient was injected into the syringe by comparing the quantification to a predetermined measurement value. FIG.

Figure 5:
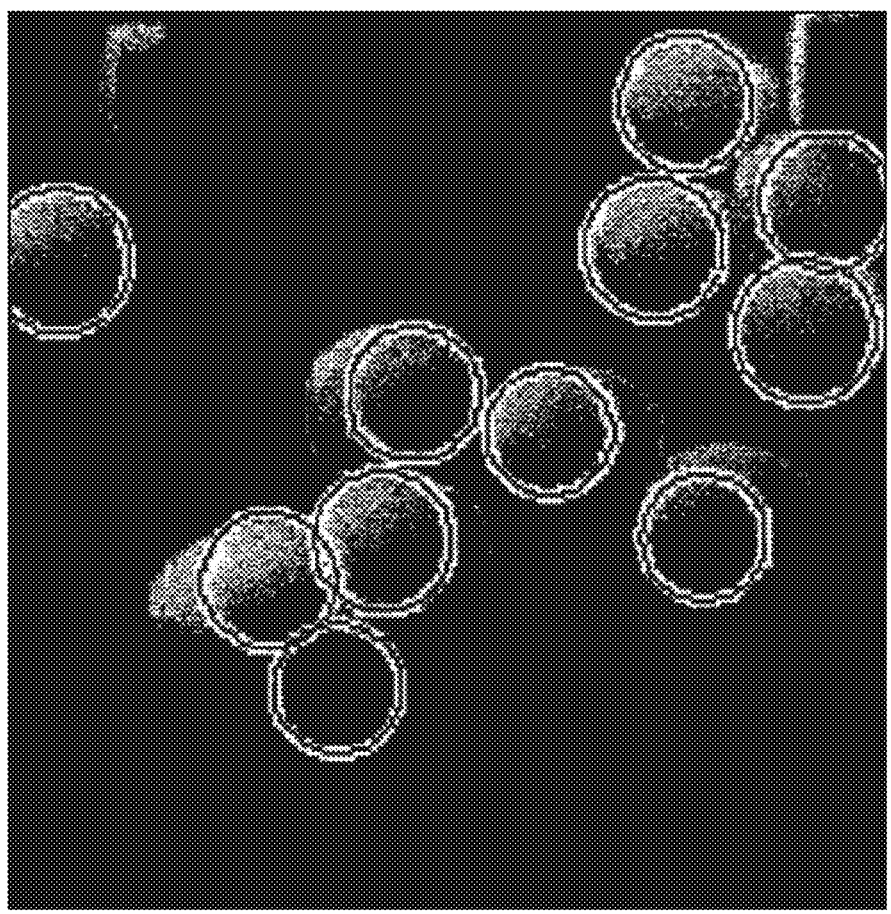
FIG. 5 shows objects including pills.

4A is an illustrative example of an object including a syringe 400. The syringe includes a plastic barrel/syringe tube 402, a plunger head 404, and a rubber plunger head/stopper 406.

Where the object includes a syringe or like equipment/device, the quantification can include a liquid fill-measure. Similarly, where the expected action includes filling a vial with capsules, and the recognition process determined that the action was performed properly, the system can further verify that the correct pill-count was indeed added to the vial. Where the action fills a bottle, container, or vial, the object(s) are the items for delivering into the vial. FIG. 5 shows objects including pills.

Figure 4A:
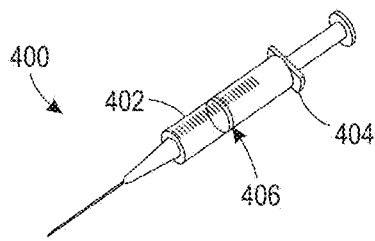
FIG. 4A is an illustrative example of an object for quantification.
Figure 4B:
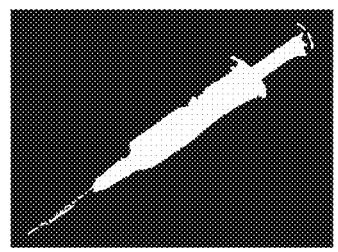
FIG. 4B is a binary image showing the object of FIG. 4A isolated from the captured image frame.

First, the object detection module 124 can select a video frame corresponding to when the object appears during the sequence of actions. Accordingly, the object detection module 124 detects the object at S320. The object of interest may be detected in relevant video frames using any known computer vision algorithm for object detection and localization. In one embodiment, the module 124 generates a binary image (or grayscale image) to determine where the object is located in the image frame. FIG. 4B is a binary image showing the syringe/object-of-interest from FIG. 4A isolated from the captured image frame. Object color, shape, and techniques such as a Deformable Part Models can isolate the object in an image and segment the filled or unfilled portion. More sophisticated methods can be applied when the background scene becomes more complex and objects are in different shapes.

Figure 4C:
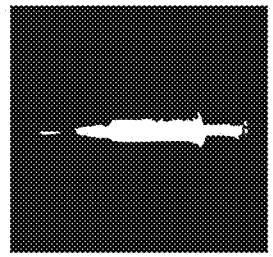
FIG. 4C shows the located object of FIG. 4B rotated to a horizontal direction.
Figure 4D:
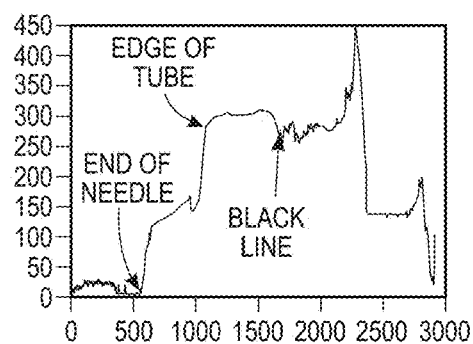
FIG. 4D shows a pixel summation plotted for the rotated binary image of FIG. 4C.

In the illustrative example, the syringe is detected in a relevant video frame for a human reviewer to later verify the amount of liquid in the barrel 402. The quantification module 126 determines a measurement value associated with the object/syringe at S322. In one embodiment, the quantification module 126 can identify the location of the stopper by summing pixels of the binary image. To ease this operation, the binary image can be rotated to a horizontal or vertical position. FIG. 4C shows the binary image of the syringe of FIG. 4B rotated to a horizontal direction. FIG. 4D shows a pixel summation of the rotated binary image plotted as column index by pixel sum. The quantification module 126 can identify the location of the stopper in the plot and use this plot location to compute or determine the liquid volume or fill-level contained in the barrel 402. In one embodiment, the storage device can store an LUT that associates the stopper position with fill-level, and the module 126 can access the LUT to convert the relative location of the stopper in the plot with a volume of liquid in the syringe ("measurement value"). However, no limitation is made herein to the approach used to compute the liquid fill-level.

As discussed supra, object detection and segmentation techniques enable the system to perform a measurement of a continuous quantity. Similar techniques can be used by the quantification module 126 to determine a measurement value (i.e., number) for countable quantities, such as pills (see FIG. 5). Quantification/measurement values can also be recorded by reading numerals from instruments, such as performing OCR on digital read-outs of a scale.

Returning to FIG. 3, the quantification module 126 can embed the measurement value into the video stream or image frame as metadata at S324. One aspect of this method is that the human performer is not disrupted mid-task to manually enter the value into a computer. In other words, the quantification feature enables an automatic measurement determination for later, automatic or manual review, for example, when the alert indicates that the action should receive greater scrutiny. In response to receiving a potential or indication of a potential error being associated with the activity workflow, the system can provide the embedded video data to the user device. In another embodiment, the system can extract the embedded measurement from the video data provide the extracted measurement to the user device. In yet another embodiment, the system can compare the extracted measurement against a predetermined value and, in response to a difference between the extracted measurement and the predetermined value meeting and exceeding a predetermined threshold, provide an alert notification (and/or the embedded video data, measurement value, etc.) to the user device. In yet another embodiment, the system can provide the embedded video data to the user device in response to the activity being verified. The method ends at S326.

In certain applications where the activity is repeatedly performed by limited persons under a control setting, the process-flow recognition steps can be simplified to perform matching against previous, confirmed recorded video(s). In this scenario, potential errors may be detected and a degree of deviations (amplitudes of the errors) may be measured.

Although the control method is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-vision based method for validating an activity workflow of a human performer, the method comprising:

acquire from a storage device in communication with a computer an expected sequence of actions associated with a target activity;

receiving at a computer a video stream from an image capture device monitoring an activity performed by an associated human performer;

using a processor, processing the video stream to detect an external cue in the video stream;

associating a frame capturing the external cue as a first frame in a key frame sequence;

using the processor, extracting features from the key frame sequence;

applying the extracted features to at least one classifier to determine an action being performed by the associated human performer in the key frame sequence;

in response to determining the action in the key frame sequence matching an expected action in the target activity, verifying the action as being performed in the monitored activity;
using the processor, comparing an ordered sequence of the verified actions against the expected sequence; and,
in response to the ordered sequence not matching the key frame sequence, generating an alert indicating an error in the monitored activity;
in response to the ordered sequence matching the key frame sequence, performing a quantification about an object detected in the key frame sequence to determine a measure associated with the object and embedding the measure in the video stream as metadata.

2. The method of claim 1, wherein the external cue is selected from a group consisting of:
an appearance of a certain object via object detection;
a video analysis to detect a segment that includes lack of motion;
a gesture made by the human performer being monitored;
audio feedback;
voice recognition;
an input made at a GUI by the associated human performer; and,
a combination of the above.

3. The method of claim 1, wherein the quantification includes:
generating a binary image of the object located in an image frame; and,
summing pixels in the binary image to compute the measure.

4. The method of claim 1, wherein in response to an error being associated with the activity workflow, the method further comprising:
extracting the embedded measure from the video stream;
comparing the extracted measure against a predetermined value; and,
in response to a difference between the extracted measure and the predetermined value meeting and exceeding a predetermined threshold, generating an alert.

5. The method of claim 1, wherein the object is a syringe and the measure is a liquid fill-level of the syringe.

6. The method of claim 1, wherein the object is one of a bottle, container, and vial, and the measure is a number of items for delivery in the object.

7. The method of claim 1, where the target activity is a production of a pharmaceutical, and the action is a step of or relating to the target activity, wherein at least one action forms the target activity.

8. The method of claim 1, in response to generating the alert, providing the video stream to a user for review.

9. The method of claim 1, wherein the determining the action includes:
performing gesture recognition on the video stream;
in response to detecting a gesture, segmenting a sequence of frames in the video stream proximate the detected gesture; and,
searching the sequence of frames for the expected action.

10. The method of claim 1, wherein the determining the action includes:
searching for visual representations in the video sequence and determining if the representations correspond to a select object.

11. A system for validating an activity workflow of a human performer, the system comprising a computer device including a memory in communication with a processor configured to:
acquire from a storage device an expected sequence of actions associated with a target activity;
receive at a computer a video stream from an image capture device monitoring an activity performed by an associated human performer;
using a processor, determining an external cue in the video stream;
associating a frame capturing the external cue as a first frame in a key frame sequence;
applying extracted features from select frames to a classifier to determine at least two actions being performed by the associated human performer in the key frame sequence;
in response to determining a sequence of the at least two actions in the key frame sequence matching the expected sequence of the target activity, verifying a quality of an associated product prepared by the monitored activity, the verifying including:
performing a quantification about an object detected in the key frame sequence to determine a measure associated with the object, and
embedding the measure in the video stream as metadata; and,
in response to not determining an action in the key frame sequence, generate an alert indicating an error in the monitored activity.

12. The system, of claim 11, wherein the external cue is selected from a group consisting of:
an appearance of a certain object via object detection;
a video analysis to detect a segment that includes lack of motion;
a gesture made by the human performer being monitored;
audio feedback;
voice recognition;
an input made at a GUI by the associated human performer; and,
a combination of the above.

13. The system, of claim 11, wherein the processor is further configured to:
generate a binary image of the object located in an image frame; and,
sum pixels in the binary image to compute the measure.

14. The system, of claim 11, wherein the processor is further configured to:
in response to an error being associated with the activity workflow, extract the embedded measure from the video stream;
compare the extracted measure against a predetermined value; and,
in response to a difference between the extracted measure and the predetermined value meeting and exceeding a predetermined threshold, generate an alert.

15. The system, of claim 11, wherein the processor is further configured to:
in response to generating the alert, provide the video stream to a user for review.

16. The system, of claim 11, wherein the processor is further configured to:
perform gesture recognition on the video stream;
in response to detecting a gesture, segment a sequence of frames in the video stream proximate the detected gesture; and,
search the sequence of frames for the expected action.

17. The system, of claim 11, wherein the processor is further configured to:

search for visual representations in the video sequence and determining if the representations correspond to a select object.

18. A computer-vision based method for validating an activity workflow of a human performer, the method comprising:

determining an expected sequence of actions associated with a target activity;

receiving at a computer a video stream from an image capture device monitoring an activity performed by an associated human performer;

applying features extracted from select frames to a classifier for determining at least two actions performed by the associated human performer in the monitored video stream;

in response to determining a sequence of the at least two actions matching the expected sequence in the monitored video stream, verifying a quality of an associated product being prepared by the monitored activity, the verifying including:

detecting an object in a key frame sequence of the video stream, performing a quantification about the object to determine a measure associated with the object, and embedding the measure in the video stream as metadata; and, in response to not determining an action in the monitored video stream, generating an alert indicating an error in the monitored activity.

\* \* \* \* \*